UNITED STATES PATENT OFFICE.

JACOB F. CLINCHARD, OF CHICAGO, ILLINOIS.

FIRE-BRICK AND PACKING FOR FURNACES AND OTHER PURPOSES.

SPECIFICATION forming part of Letters Patent No. 314,802, dated March 31, 1885.

Application filed October 20, 1884. (No specimens.)

*To all whom it may concern:*

Be it known that I, JACOB F. CLINCHARD, of Chicago, in the county of Cook and State of Illinois, have discovered certain new and useful Improvements in Fire-Brick and Packing for Furnaces and other Purposes, of which the following is a description.

Great difficulty has heretofore been experienced in obtaining satisfactory fire-brick or packing for smelting and other furnaces, owing particularly to the deleterious action of antimony thereon, as well as to the brittleness of the substances heretofore used or the tendency thereof to become brittle.

The object of my invention is to utilize the slag or refuse from smelting-furnaces in producing a compound which may overcome these difficulties, and which may be cheaply and readily manufactured.

My improved fire-brick or packing consists, preferably, of the following ingredients, combined substantially in the proportions stated, viz: bicarbonate of soda, six parts; slag from metal or blast furnaces, twenty-four parts; fire-clay, six parts, with sufficient water to mix, as hereinafter stated.

I first grind the respective materials, preferably to the fineness of flour or sand, or thereabout, mix them well together, and add a sufficient quantity of water to form a thick paste. This should be thoroughly worked, after which, if it is to be used for fire-brick, it should be formed into molds of the requisite size and shape, dried, and then baked in the usual way, like pottery or ordinary fire-brick. As a packing, it may be inserted into the furnace in a plastic state.

If it is desirable to make the brick or packing harder and more refractory, I prefer to add iron-slag and plumbago, in the proportions of about one-sixth and one-tenth, respectively, to the mixture. The plumbago serves to render the compound more impervious to the action of intense heat.

Instead of the fire-clay, ground fire-brick may be used with good results, and saltpeter may be adopted as an equivalent and in lieu of the bicarbonate of soda, though I prefer the former.

One obvious advantage of said mixture, especially for use as a furnace-packing, is that the shrinkage is imperceptible, while its resistance to the chemical action of antimony is much greater than that of any compound heretofore in use.

When combined and treated substantially as stated, and baked, the mixture becomes very hard, and the brittleness of the slag—which has heretofore been an insuperable objection to its use—is overcome. Owing to the large proportion of refuse or slag used in the mixture, the same may be produced at a minimum cost, while its application may be very extensive. It not only forms a superior lining for stoves, grates, and the like, but may be used as a filling between floors and other places to form fire-proof buildings. It may likewise, when formed into blocks and baked, be used in lieu of stone as a building material or for pavements.

I do not confine myself to the exact proportions stated, as a variation therefrom may produce good results; but I have found said proportions the most satisfactory in actual practice.

Having thus described my invention, what I claim, and desire to secure by Letters Patent, is—

1. The combination of bicarbonate of soda, iron or other furnace slag, and fire-clay with water to mix the same, substantially in the proportions and for the purposes specified.

2. The combination of bicarbonate of soda, or any chemical equivalent, with furnace-slag and fire-clay, substantially in the manner and for the purposes set forth.

3. As a new article of manufacture, the combination of bicarbonate of soda, or its chemical equivalent, with furnace-slag, fire-clay, and water, substantially in the manner and for the purposes described.

JACOB F. CLINCHARD.

Witnesses:
W. W. GOODALL,
H. C. DIEHL.